US012152776B2

(12) United States Patent
Kobayashi

(10) Patent No.: US 12,152,776 B2
(45) Date of Patent: Nov. 26, 2024

(54) HEATER AND GLOW-PLUG PROVIDED THEREWITH

(71) Applicant: KYOCERA Corporation, Kyoto (JP)

(72) Inventor: Akio Kobayashi, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 963 days.

(21) Appl. No.: 17/267,131

(22) PCT Filed: Sep. 27, 2019

(86) PCT No.: PCT/JP2019/038369
§ 371 (c)(1),
(2) Date: Feb. 9, 2021

(87) PCT Pub. No.: WO2020/067508
PCT Pub. Date: Apr. 2, 2020

(65) Prior Publication Data

US 2021/0310656 A1 Oct. 7, 2021

(30) Foreign Application Priority Data

Sep. 28, 2018 (JP) ................................ 2018-185455

(51) Int. Cl.
*H05B 3/48* (2006.01)
*F23Q 7/00* (2006.01)
*H05B 3/06* (2006.01)

(52) U.S. Cl.
CPC ............... *F23Q 7/00* (2013.01); *F23Q 7/001* (2013.01); *H05B 3/06* (2013.01); *H05B 3/48* (2013.01)

(58) Field of Classification Search
CPC ........... F23Q 7/001; H05B 3/48; H05B 3/141; H05B 3/18
See application file for complete search history.

(56) References Cited

U.S. PATENT DOCUMENTS 5,894,541 A * 4/1999 Eckert ................ F27D 99/0006 373/117
6,069,910 A * 5/2000 Eckert ...................... H05B 3/48 373/42
2002/0170903 A1* 11/2002 Taniguchi ............... F23Q 7/001 219/544
2003/0042242 A1 3/2003 Taniguchi et al.
(Continued)

FOREIGN PATENT DOCUMENTS

JP 2003-148731 A 5/2003

*Primary Examiner* — Dana Ross
*Assistant Examiner* — Lawrence H Samuels
(74) *Attorney, Agent, or Firm* — Volpe Koenig

(57) ABSTRACT

A heater of the disclosure includes: a rod-like ceramic body; a heat-generating resistor including an embedded portion embedded in the ceramic body and an exposed portion drawn out to an outer periphery face of the ceramic body; a metallic member electrically connected to the heat-generating resistor; and a conductive joining member including titanium, the conductive joining member being configured to join the exposed portion and the metallic member together. The conductive joining member includes a first portion in layer form, in which titanium exists in segregation condition, located along an interface with the exposed portion; and at least one second portion in granular form, in which titanium exists in segregation condition, located away from the first portion.

6 Claims, 5 Drawing Sheets

(56) References Cited

U.S. PATENT DOCUMENTS

| | | | | | |
|---|---|---|---|---|---|
| 2003/0042243 | A1* | 3/2003 | Taniguchi | H05B 3/141 | 219/270 |
| 2007/0221661 | A1* | 9/2007 | Nagasako | B23K 35/3013 | 219/544 |
| 2010/0059496 | A1* | 3/2010 | Rena | F02P 19/02 | 219/270 |
| 2010/0288746 | A1* | 11/2010 | Takenouchi | H05B 3/141 | 219/209 |
| 2011/0068091 | A1* | 3/2011 | Hiura | F23Q 7/001 | 219/544 |
| 2011/0240625 | A1* | 10/2011 | Takenouchi | G01N 27/407 | 219/260 |
| 2014/0042145 | A1* | 2/2014 | Okamura | F23Q 7/22 | 219/544 |
| 2014/0224783 | A1* | 8/2014 | Taimura | F23Q 7/001 | 219/544 |
| 2014/0299592 | A1* | 10/2014 | Kukino | H05B 3/10 | 219/544 |
| 2015/0001207 | A1* | 1/2015 | Kobayashi | H05B 3/48 | 219/544 |

* cited by examiner

HEATER AND GLOW-PLUG PROVIDED THEREWITH

CROSS-REFERENCE TO RELATED APPLICATION

This application is a national stage entry according to 35 U.S.C. 371 of International Application No. PCT/JP2019/038369 filed on Sep. 27, 2019, which claims priority to Japanese Patent Application No. 2018-185455 filed on Sep. 28, 2018, the contents of which are entirely incorporated herein by reference.

TECHNICAL FIELD

The present disclosure relates to a heater adaptable for use as various heaters, including a heater used for ignition or flame detection purposes in a combustion-type vehicle-mounted heating unit, a heater used for ignition purposes in various combustors such as an oil fan heater, a heater for use in a glow-plug of a diesel engine, a heater for use in various sensors such as an oxygen sensor, and a heater used for heating purposes in measuring equipment, and also relates to a glow-plug provided therewith.

BACKGROUND

As a heater for use in a glow-plug of a diesel engine, there is a heretofore known heater including: a rod-like ceramic body; a heat-generating resistor embedded in the ceramic body, one end of which is exposed at a surface of the ceramic body; and a metallic member which is electrically connected via a joining member containing an active metal to the one end of the heat-generating resistor (for example, refer to Japanese Unexamined Patent Publication JP-A 2003-148731 (Patent Literature 1)).

The development of ever-more-downsized heaters have been pursued in recent years. In a downsized heater, a junction between a heat-generating resistor and a metallic member is located close to a region of the heat-generating resistor which liberates especially more heat, that is; a heat-generating region. In this case, following a long-term use of the heater, a microcrack may appear in the joining member containing the active metal due to stress resulting from a difference in thermal expansion between the ceramic body and the metallic member, thus causing decreased electrical-connection reliability in the heater. This problem has created a demand for a highly durable and reliable heater which is less prone to the occurrence of a microcrack in the joining member even after an extended period of use.

SUMMARY

A heater according to an embodiment of the disclosure includes:

- a ceramic body having a rod-like shape;
- a heat-generating resistor including an embedded portion embedded in the ceramic body and an exposed portion drawn out to an outer periphery face of the ceramic body;
- a metallic member electrically connected to the heat-generating resistor; and
- a conductive joining member including titanium, the conductive joining member being configured to join the exposed portion and the metallic member together and including

- a first portion in layer form, in which titanium exists in segregation condition, located along an interface with the exposed portion; and
  - at least one second portion in granular form, in which titanium exists in segregation condition, located away from the first portion.

A glow-plug according to an embodiment of the disclosure includes:

- the heater as described above, wherein the metallic member is a tubular body configured to cover part of the outer periphery face of the ceramic body, and the heat-generating resistor is a linear member including at least a bend portion,
  - one end, the one end drawn out to a bottom face of the ceramic body, and
  - another end, the exposed portion being located at the other end; and
- an electrode member electrically connected to the one end of the linear member.

BRIEF DESCRIPTION OF DRAWINGS

Other and further objects, features, and advantages of the disclosure will be more explicit from the following detailed description taken with reference to the drawings wherein.

DETAILED DESCRIPTION

Embodiments of the heater according to the disclosure will now be described in detail with reference to the drawings.

Figure 1:
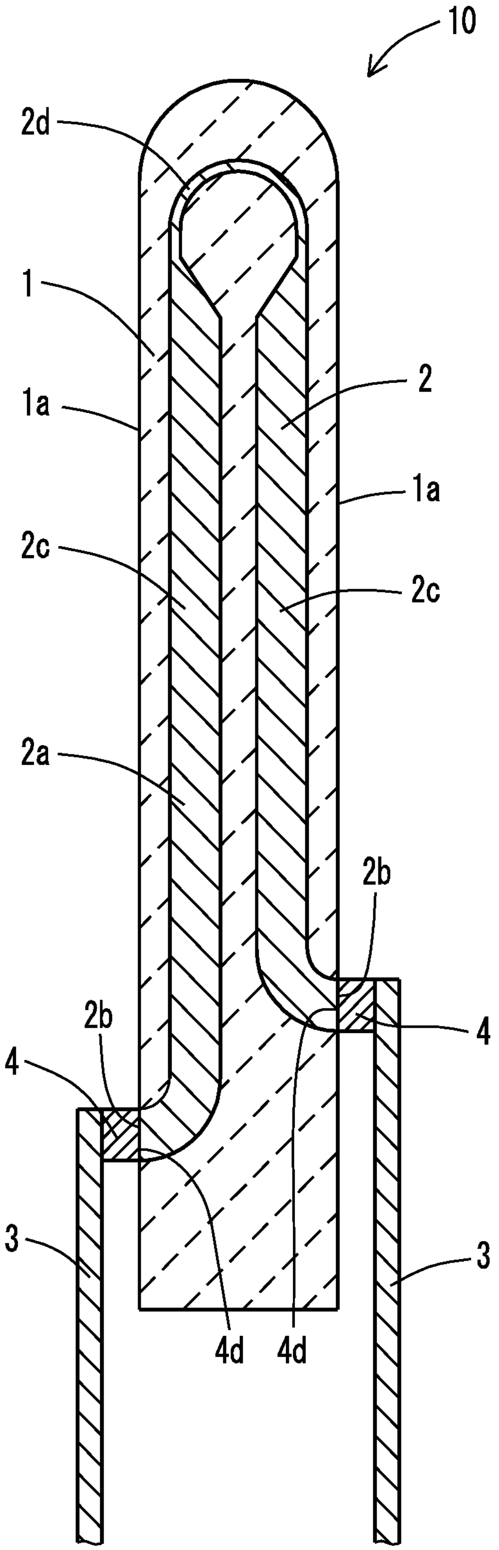
FIG. 1 is a sectional view showing a heater according to an embodiment of the disclosure.
Figure 2:
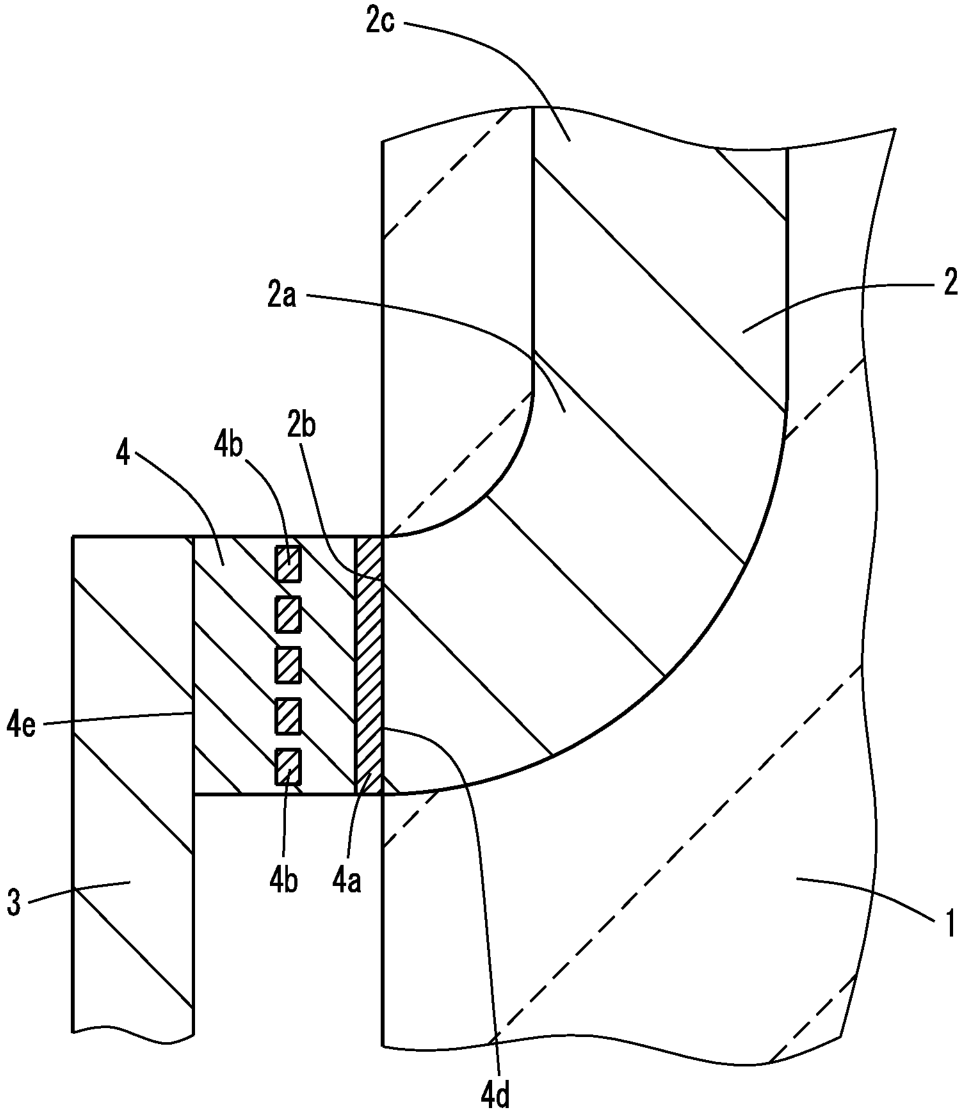
FIG. 2 is an enlarged sectional view showing the main components of the heater shown in FIG. 1.

FIG. 1 is a sectional view showing a heater according to an embodiment of the disclosure, and FIG. 2 is an enlarged sectional view showing the main components of the heater shown in FIG. 1.

A heater 10 includes a ceramic body 1, a heat-generating resistor 2, a metallic member 3, and a joining member 4.

The ceramic body 1 is a rod-like member made of a ceramic material. The ceramic body 1 includes a front end and a rear end, which are one end and the other end, respectively, of the ceramic body 1 in a longitudinal direction (vertical direction as viewed in FIG. 1). The ceramic body 1 may be shaped either in a prismatic bar or in a round bar. For example, as shown in FIG. 1, the ceramic body 1 may be configured to include a hemispherical front end. Examples of the ceramic material used in the ceramic body 1 include electrically insulating ceramics such as oxide ceramics, nitride ceramics, carbide ceramics, and silicon nitride ceramics.

The ceramic body 1 may be set 20 to 50 mm in length in the longitudinal direction thereof. In the case where the ceramic body 1 has the form of a round bar, its cross-section taken in a direction perpendicular to the longitudinal direction may be set to 2 to 5 mm in diameter.

The heat-generating resistor 2 is a member which liberates heat upon application of electric current thereto. The heat-generating resistor 2 includes an embedded portion 2*a* embedded in the ceramic body 1 and an exposed portion 2*b* drawn out to an outer periphery face 1*a* of the ceramic body 1. For example, as shown in FIG. 1, the embedded portion 2*a* of the heat-generating resistor 2 has a turned-back configuration including two paralleled portions 2*c* arranged facing each other, and a bend portion 2*d* located on the front end side of the ceramic body 1 so as to provide connection between the two paralleled portions 2*c*. For example, the paralleled portions 2*c* may be each set to 0.15 to 3 $mm^2$ in sectional area. For example, the bend portion 2*d* may be set to 0.15 to 0.8 $mm^2$ in sectional area.

For example, the heat-generating resistor 2 can contain a carbide, nitride, or silicide of tungsten (W), molybdenum (Mo), or titanium, as a main component. The heat-generating resistor 2 may contain the material for forming the ceramic body 1.

The heat-generating resistor 2 may include a heat-generating region which liberates especially more heat. For example, the bend portion 2*d* may serve as the heat-generating region. In this case, for example, as shown in FIG. 1, the bend portion 2*d* may be made smaller in sectional area than the paralleled portions 2*c* to increase electrical resistance per unit length in the bend portion 2*d*. Alternatively, by making a content of the material for forming the ceramic body 1 of the bend portion 2*d* greater than a content of the material for forming the ceramic body 1 of the paralleled portions 2*c*, electrical resistance per unit length in the bend portion 2*d* may be increased.

The paralleled portions 2*c* of the heat-generating resistor 2, being greater in sectional area than the bend portion 2*d* or smaller in content of the material for forming the ceramic body 1 than the bend portion 2*d*, are lower in electrical resistance per unit length than the bend portion 2*d*. The paralleled portions 2*c* may contain, as a primary component, tungsten carbide (WC) which is an inorganic conductor, and silicon nitride ($Si_3N_4$) as a secondary component. The paralleled portions 2*c* may contain silicon nitride in an amount of 15% by mass or more. As the content of silicon nitride in the paralleled portions 2*c* increases, a thermal expansion of the paralleled portions 2*c* can be close to a thermal expansion of silicon nitride constituting the ceramic body 1. Moreover, in the case where the content of silicon nitride is 40% by mass or less, the resistance of the paralleled portions 2*c* becomes low and stable. The paralleled portions 2*c* may contain silicon nitride in an amount of 15 to 40% by mass accordingly.

The metallic member 3 is electrically connected to the heat-generating resistor 2. For example, the metallic member 3 is made of metal such as iron (Fe), chromium (Cr), or nickel (Ni), for example. In this embodiment, the metallic member 3 is an elongated member, and one end thereof is electrically connected via the joining member 4 to the exposed portion 2*b* of the heat-generating resistor 2. For example, the other end of the metallic member 3 is electrically connected to an external connection electrode.

The joining member 4 is a member for providing connection between the exposed portion 2*b* of the heat-generating resistor 2 and the metallic member 3. The joining member 4 contains titanium and is electrically conductive. The joining member 4 may cover part of the surface of the exposed portion 2*b*, or may cover the whole surface of the exposed portion 2*b* as shown in FIG. 1. Examples of the material for forming the joining member include a silver (Ag)-copper (Cu)-titanium (Ti) brazing material and a material obtained by applying a coating of Ni in a diffused state to the Ag—Cu—Ti brazing material. For example, as shown in FIG. 1, the joining member 4 includes a first portion 4*a* in layer form, in which Ti exists in segregation condition, located along an interface 4*d* with the exposed portion 2*b*, and at least one second portion 4*b* in granular form, in which Ti exists in segregation condition, located away from the first portion 4*a*.

Under repeated cycles of a temperature rise and cooling in the operation to drive the heater 10, a portion of the joining member 4 in which Ti exists in segregation condition, being called Ti-segregation portion, is gradually oxidized from its area exposed to air. The oxidized Ti-segregation portion is prone to the concentration of stress resulting from the difference in thermal expansion between the ceramic body 1 and the metallic member 3. In this embodiment, the joining member 4 is not disposed between the ceramic body 1 and the metallic member 3 but is disposed between the heat-generating resistor 2 and the metallic member 3. Since the heat-generating resistor 2 is disposed within the ceramic body 1, the thermal stress developed in the oxidized Ti-segregation portion is substantially attributable to the difference in thermal expansion between the ceramic body 1 and the metallic member 3.

If the first portion 4*a* is the only one that constitutes the Ti-segregation portion of the joining member 4, the joining member 4 will be prone to the occurrence of a microcrack originating from the boundary between the first portion 4*a* and an area contiguous to the first portion 4*a*. In this regard, the heater 10 according to this embodiment includes, in addition to the first portion 4*a*, the second portion 4*b* located away from the first portion 4*a*. Thus, in the heater 10 according to this embodiment, the stress resulting from the difference in thermal expansion between the ceramic body 1 and the metallic member 3 is distributed between the first portion 4*a* and the second portion 4*b*. This makes it possible to reduce the occurrence of a microcrack and eventually reduce variations in the electrical resistance of the heater 10. In consequence, durability and reliability of the heater 10 according to this embodiment can be improved.

For example, as shown in FIG. 2, a plurality of second portions 4*b* may be arranged along the first portion 4*a*. In other words, the plurality of second portions 4*b* may be arranged along the outer periphery face 1*a* of the ceramic body 1. The stress developed in the joining member 4 due to the difference in thermal expansion between the ceramic body 1 and the metallic member 3 is basically shear stress which is exerted in the longitudinal direction of the ceramic body 1. Accordingly, in the case where the second portion 4*b* has the form of a continuous layer extending in the longitudinal direction of the ceramic body 1, stress will be concentrated on each end of the second portion 4*b* in the longitudinal direction of the ceramic body 1, with the consequent development of a microcrack from the ends of the second portion 4*b*. In this embodiment, since there are provided the plurality of second portions 4*b* in granular form arranged along the outer periphery face 1*a* of the ceramic body 1, this arrangement allows the stress resulting from the difference in thermal expansion between the ceramic body 1 and the metallic member 3 to be distributed among the plurality of second portions 4*b*, ensuring effective relaxation of the stress resulting from the difference in thermal expansion between the ceramic body 1 and the metallic member 3. This makes it possible to reduce the occurrence of a microcrack effectively, and thereby durability and reliability of the heater 10 can be improved. Moreover, in the heater 10 according to this embodiment, the second portion 4*b* has the form of an arrangement of the plurality of second portions 4*b* in granular form. This makes it possible to restrain the second portion 4*b* from blocking a current path defined between the heat-generating resistor 2 and the metallic member 3.

Figure 3:
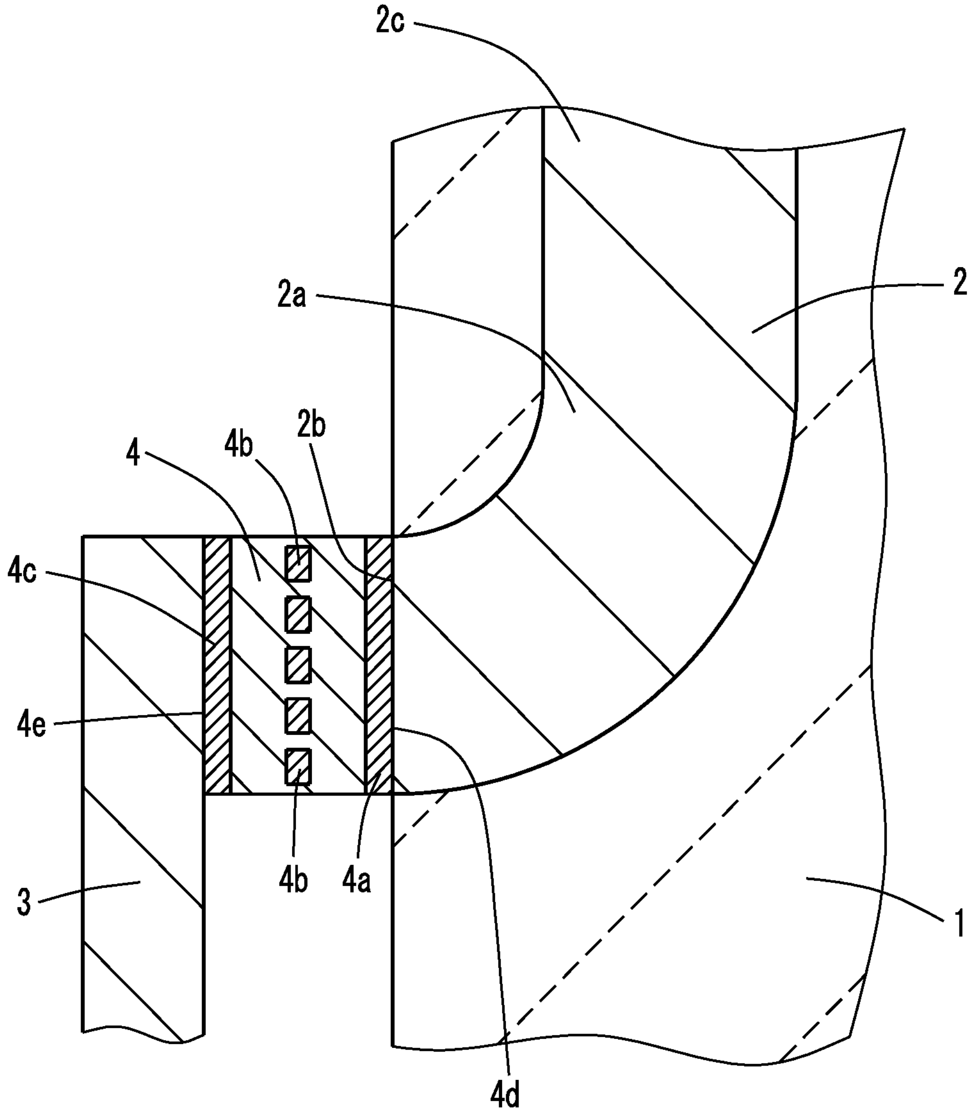
FIG. 3 is an enlarged sectional view showing the main components of a heater according to another embodiment of the disclosure.

FIG. 3 is an enlarged sectional view showing the main components of a heater according to another embodiment of the disclosure. FIG. 3 corresponds to the enlarged sectional view of the main components of the heater shown in FIG. 2.

For example, as shown in FIG. 3, the joining member 4 further includes a third portion 4*c* in layer form, in which Ti exists in segregation condition, located along an interface 4*e* with the metallic member 3. The third portion 4*c* may be located away from the first portion 4*a* and the second portion 4*b*. With the joining member 4 configured to have the third portion 4*c* in addition to the first portion 4*a* and the second portion 4*b*, the stress resulting from the difference in thermal expansion between the ceramic body 1 and the metallic member 3 can be distributed among the first portion 4*a*, the second portion 4*b*, and the third portion 4*c*. This makes it possible to reduce the occurrence of a microcrack effectively and eventually reduce variations in the electrical resistance of the heater 10 effectively, and thereby durability and reliability of the heater 10 can be improved.

Moreover, with the joining member 4 configured to include both of the first portion 4*a* lying along the interface 4*d* with the exposed portion 2*b* and the third portion 4*c* lying along the interface 4*e* with the metallic member 3, the balance can be achieved between the stress exerted on the first portion 4*a* and the stress exerted on the third portion 4*c*. Thus, since stress can be uniformly distributed to the first portion 4*a* and the third portion 4*c*, it is possible to reduce the occurrence of a microcrack effectively and eventually reduce variations in the electrical resistance of the heater 10 effectively. As a result, durability and reliability of the heater 10 can be improved.

The joining member 4 may contain copper, and the second portion 4*b* may contain segregated copper. A Cu—Ti alloy is more susceptible to oxidation than a Ag—Cu brazing material, and is also more susceptible to oxidation than Ti in itself. Hence, in the case where the second portion 4*b* contains segregated Ti and segregated Cu, the second portion 4*b* becomes more susceptible to oxidation than the first portion 4*a* and the third portion 4*c*. This makes it possible to further enhance the stress relaxation effect provided by the second portion 4*b*. Thereby, durability and reliability of the heater 10 can be improved.

The first portion 4*a* may cover the whole surface of the exposed portion 2*b*. This makes it possible to protect the heat-generating resistor 2 from oxidation caused by exposure to air, as well as to strengthen the connection between the heat-generating resistor 2 and the joining member 4. As a result, durability and reliability of the heater 10 can be improved.

Figure 4:
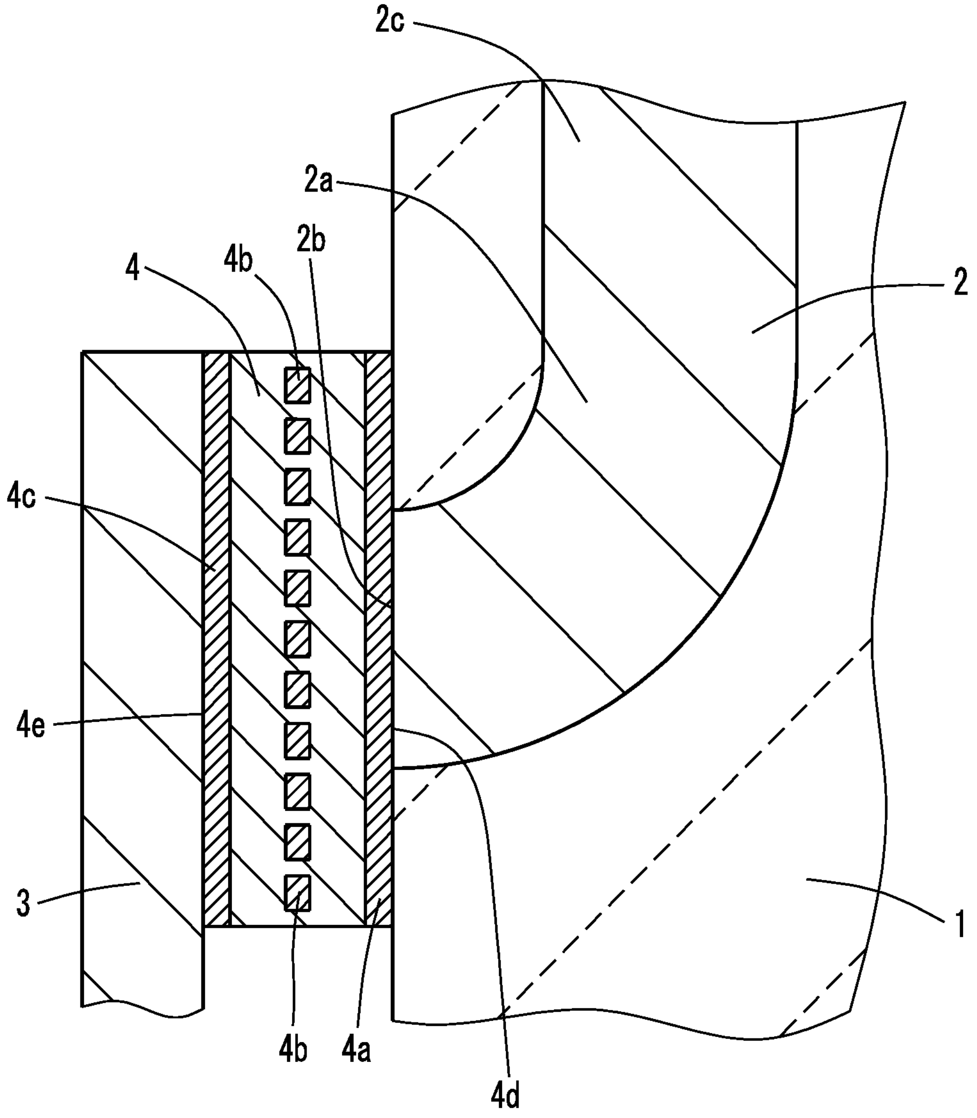
FIG. 4 is an enlarged sectional view showing the main components of a heater according to still another embodiment of the disclosure.

FIG. 4 is an enlarged sectional view showing the main components of a heater according to still another embodiment of the disclosure. FIG. 4 corresponds to the enlarged sectional view of the main components of the heater shown in FIG. 2.

For example, as shown in FIG. 4, the joining member 4 may further cover a part of the surface of the ceramic body 1 located around the exposed portion 2*b*. With this design, the heat-generating resistor 2 can be effectively protected from oxidation caused by exposure to air. Moreover, this design permits not only bonding of the heat-generating resistor 2 with the metallic member 3 but also bonding of the ceramic body 1 with the metallic member 3. This makes it possible to enhance the mechanical strength of the heater. As a result, durability and reliability of the heater 10 can be improved.

The following describes a method for manufacturing the heater 10 according to this embodiment.

For example, the heater 10 according to this embodiment is produced by means of injection molding or otherwise using molds made to conform to the shapes of the ceramic body 1 and the heat-generating resistor 2.

First, a ceramic paste containing insulating ceramic powder, a resin binder, etc. for forming the ceramic body 1 is prepared. In addition, an electrically conductive paste containing conductive ceramic powder, a resin binder, etc. for forming the heat-generating resistor 2 is prepared. Next, the resulting conductive paste is subjected to a molding process such as an injection molding process to produce a molded conductive-paste product of predetermined pattern for forming the heat-generating resistor 2. With the molded conductive-paste product retained within a set of the molds, some of the molds are replaced with those for the molding of the ceramic body 1. After that, the ceramic body 1-forming ceramic paste is charged into the molds. Thus, there is obtained a molded product in the form of a molded heat-generating-resistor 2 product covered with a molded ceramic-body 1 product. For example, the resulting molded product is fired at a temperature of 1650 to 1800° C. under a pressure of 30 to 50 MPa. Thus, a ceramic body 1 including a heat-generating resistor 2 therein is obtained. After that, the ceramic body 1 including the heat-generating resistor 2 therein is joined via a joining material 4 to a metallic member 3 made for example of Fe, Cr, or Ni. In this way, the heater 10 according to this embodiment is obtained.

The following describes a way to form the joining member 4. First, a brazing material for forming the joining member 4 is produced by dispersively adding an excessive amount of Ti to a Ag—Cu brazing material, and thereafter adjusting the content of Cu to more than 28% by mass corresponding to a Cu content based on the Ag—Cu eutectic composition. Next, the resulting joining member 4-forming brazing material is placed in a predetermined location between the ceramic body 1 including the heat-generating resistor 2 therein and the metallic member 3. After that, on the basis of the fact that Cu is higher in melting point than Ag, in a vacuum chamber set for a pressure of lower than a normal atmospheric pressure, the temperature is raised to 960° C. or higher, which is higher than the eutectic temperature of Ag—Cu: 780° C. This initiates the melting of Ag, and enables metallization to proceed only with Ag and Ti at the interface 4*d* with the exposed portion 2*b*, as well as at the interface 4*e* with the metallic member 3. In this process, although Cu is caused to undergo oxidation under conditions where the degree of vacuum in the vacuum chamber is low, an increase of the degree of vacuum to above $10^{-5}$ Torr causes evaporation of Ag. Thus, argon (Ar) is introduced into the vacuum chamber to lower the degree of vacuum. At this time, it is advisable to introduce oxygen ($O_2$) in conjunction with argon. Although oxygen introduction expedites Cu oxidation, considering that a Cu—Ti—O compound becomes more stable than copper oxide, the introduction is conducive to the formation of the joining member 4 including the first and third portions 4*a* and 4*c* containing Ti in segregation condition, and the second portion 4*b* containing Ti and Cu in segregation condition. The reason why the second portion 4*b* is located away from the ceramic body 1 and the metallic member 3 is because Ag in a molten state is diffused between the second portion 4*b* and the ceramic body 1, as well as between the second portion 4*b* and the metallic member 3.

The types of segregated elements and their distributions in the joining member 4 can be identified and determined by performing elemental mapping on the cut surface of the sectioned joining member 4. To carry out elemental mapping, for example, after cutting the joining member 4 along the longitudinal direction of the heater 10, the cut surface is mirror-finished, and the mirror-finished cut surface is subjected to quantitative analysis using Wavelength-dispersive electron probe microanalyzer (e.g. the JXA-8530F manufactured by JEOL Ltd.) or Auger electron spectroscopy analyzer (e.g. the JAMP-9500F manufactured by JEOL Ltd.).

Figure 5:
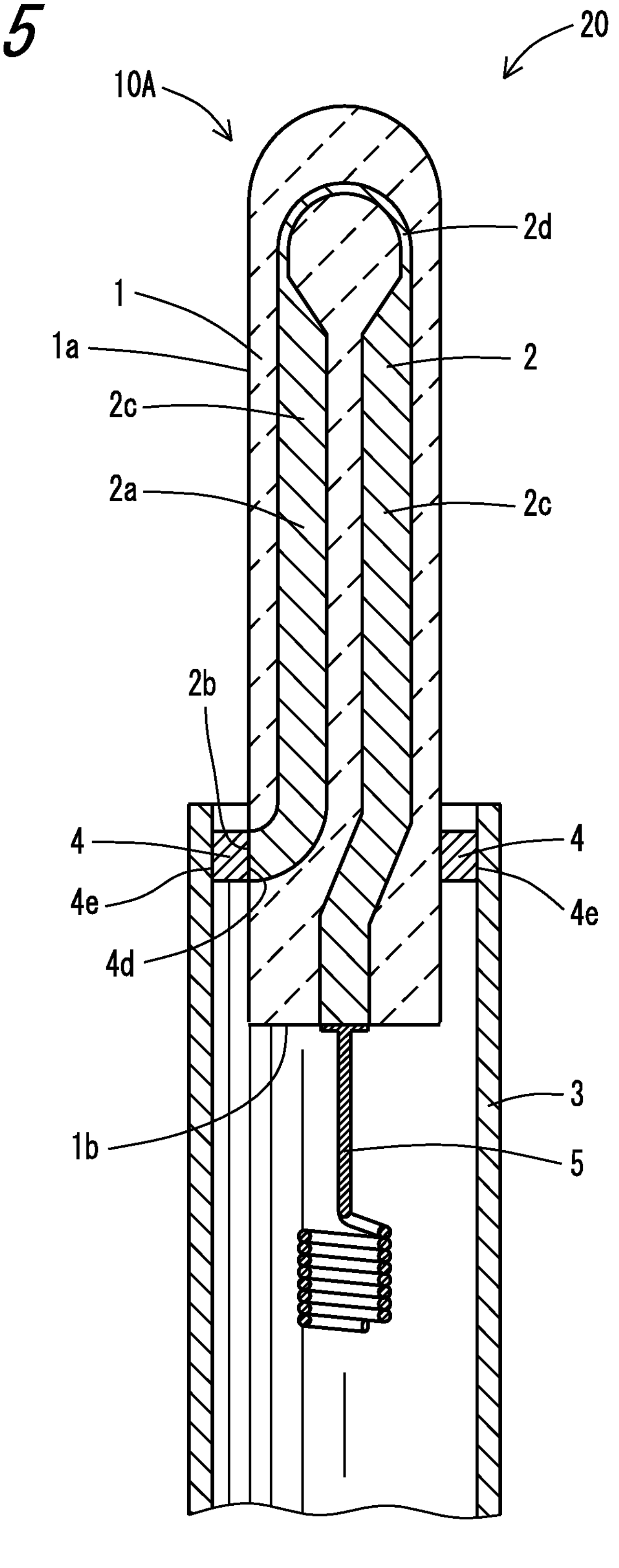
FIG. 5 is a sectional view showing a glow-plug according to an embodiment of the disclosure.

A glow-plug according to an embodiment of the disclosure will now be described. FIG. 5 is a sectional view showing a glow-plug according to an embodiment of the disclosure.

A glow-plug 20 according to this embodiment includes a heater 10A and an electrode member 5.

The heater 10A incorporated in the glow-plug 20 according to this embodiment differs from the heater 10 according to the preceding embodiment in the configurations of the heat-generating resistor 2, the metallic member 3, and the joining member 4. The heater 10A also differs from the heater 10 in that the heater includes the electrode member 5. Otherwise, the heater 10A is structurally similar to the heater 10, and thus detailed explanation of structural features common to these heaters will be omitted.

In this embodiment, the heat-generating resistor 2 includes one end drawn out to the bottom face of the ceramic body 1 (the rear end face of the ceramic body 1), and the electrode member 5 is electrically connected to the one end of the heat-generating resistor 2. In the heater 10A according to this embodiment, as in the heater 10 according to the preceding embodiment, the heat-generating resistor 2 is a linear member including at least a bend portion 2*d*. The exposed portion 2*b* of the heat-generating resistor 2 is located at the other end of the heat-generating resistor 2.

In this embodiment, the metallic member 3 is a tubular body, and covers part of the outer periphery face 1*a* of the ceramic body 1. In this embodiment, for example, as shown in FIG. 5, the metallic member 3 covers part of the rear-end side of the ceramic body 1. For example, the metallic member 3 is set to 2.1 to 5.5 mm in inside diameter, and 2.5 to 10 mm in outside diameter. Moreover, for example, the metallic member 3 is set to to 150 mm in length in the longitudinal direction of the ceramic body 1.

In this embodiment, the joining member 4 is provided so as to cover the exposed portion 2*b*, as well as to surround the ceramic body 1 circumferentially. This design strengthens the connection between the ceramic body 1 and the metallic member 3. For example, the joining member 4 is set to 0.01 to 0.2 mm in thickness in a direction perpendicular to the longitudinal direction of the ceramic body 1, and 10 to 40 mm in length in the longitudinal direction of the ceramic body 1.

The first portion 4*a* of the joining member 4 may be disposed in layer form along at least the interface 4*d* with the exposed portion 2*b*. The first portion 4*a* may be formed over the entire area of the interface with the ceramic body 1, or may be formed on part of the interface with the ceramic body 1. At least one second portion 4*b* may be located away from the first portion 4*a*. The plurality of second portions 4*b* may be disposed along the entire periphery or part of the periphery of the ceramic body 1. Moreover, the plurality of second portions 4*b* may be arranged in the longitudinal direction of the ceramic body 1. The third portion 4*c* may be formed over the entire area of the interface 4*e* with the metallic member 3, or may be formed on part of the interface 4*e* with the metallic member 3.

In this embodiment, the electrode member 5 is electrically connected to one end of the heat-generating resistor 2 drawn out to the bottom face 1*b* of the ceramic body 1. For example, as shown in FIG. 5, the electrode member 5 is located inside the metallic member 3, and makes electrical connection with the one end of the heat-generating resistor 2. While the electrode member 5 may be made in various forms, in this embodiment, the electrode member 5 includes a coiled portion which is electrically connected to an external connection electrode. The electrode member 5 is retained away from the inner periphery face of the metallic member 3 to prevent the occurrence of electrical short-circuiting between the electrode member 5 and the metallic member 3. Application of a voltage to between the metallic member 3 and the electrode member 5 by an external power supply permits the passage of electric current through the heat-generating resistor 2 via the metallic member 3 and the electrode member 5. For example, the electrode member 5 is made of Ni or stainless steel.

The glow-plug 20 according to this embodiment includes the heater 10A thus far described, and can be thus provided as a highly durable and reliable glow-plug.

Although specific embodiments of the disclosure have been detailed herein, it is to be understood that the disclosure is not limited to the above-described embodiments, and hence various changes, modifications, and improvements may be made therein without departing from the gist of the disclosure.

REFERENCE SIGNS LIST

1: Ceramic body
1*a*: Outer periphery face
1*b*: Bottom face
2: Heat-generating resistor
2*a*: Embedded portion
2*b*: Exposed portion
2*c* Paralleled portion
2*d*: Bend portion
3: Metallic member
4: Joining member
4*a*: First portion
4*b*: Second portion
4*c*: Third portion
4*d*, 4*e*: Interface
5: Electrode member
10, 10A: Heater
20: Glow-plug

The invention claimed is:

1. A heater comprising:

a ceramic body having a rod-like shape;

a heat-generating resistor comprising an embedded portion embedded in the ceramic body and an exposed portion drawn out to an outer periphery face of the ceramic body;

a metallic member electrically connected to the heat-generating resistor; and a conductive joining member that joins the exposed portion and the metallic member together, wherein the conductive joining member comprises:

a first portion in layer form, in which titanium exists in segregation, located along an interface with the exposed portion; and at least one second portion that comprises a Cu—Ti—O compound in which copper and titanium exist in segregation, wherein the at least one second portion is located away from the first portion and is in a granular form that is different than the layer form.

2. The heater according to claim 1, wherein the at least one second portion is arranged along the first portion.

3. The heater according to claim 1, wherein the conductive joining member further comprises a third portion in layer form, in which titanium exists in segregation, wherein the third portion is located along an interface with the metallic member.

4. The heater according to claim 1, wherein the first portion covers an entire surface of the exposed portion.

5. The heater according to claim 1, wherein the conductive joining member covers a part of a surface of the ceramic body located around the exposed portion.

6. A glow-plug comprising:

the heater according to claim 1, wherein the metallic member is a tubular body configured to cover part of the outer periphery face of the ceramic body, and the heat-generating resistor is a linear member comprising at least a bend portion, one end, the one end drawn out to a bottom face of the ceramic body, and another end, the exposed portion being located at the other end; and an electrode member electrically connected to the one end of the linear member.

* * * * *